Nov. 26, 1957 D. M. LIPKIN 2,814,733

MODIFIED PULSE TYPE TRANSVERSE MAGNETIC AMPLIFIER WITH PROGRESSIVE SIGNAL GROWTH

Filed March 17, 1955

INVENTOR

DANIEL M. LIPKIN

BY Charles C. English

AGENT

United States Patent Office 2,814,733
Patented Nov. 26, 1957

2,814,733

MODIFIED PULSE TYPE TRANSVERSE MAGNETIC AMPLIFIER WITH PROGRESSIVE SIGNAL GROWTH

Daniel M. Lipkin, Philadelphia, Pa., assignor to Sperry Rand Corporation, New York, N. Y., a corporation of Delaware Application March 17, 1955, Serial No. 494,906

5 Claims. (Cl. 307—88)

The present invention concerns a transverse magnetic amplifier using radio-frequency power to produce a progressive growth of signal-induced oscillations in an inductance capacitance circuit.

It is an object of the invention to provide a transverse magnetic amplifier in which a signal input is used to initiate oscillations in an inductance capacitance circuit, the impulse source being decoupled from the inductance capacitance circuit for the remainder of the single amplification process.

It is an object of the invention to provide a transverse magnetic amplifier with progressive signal growth in which periodic change in the level of transverse magnetic bias combine with dual power-operated blocking voltage sources supplying timed pulses to build the output signal current up to a desired amplified value.

It is an object of the invention to provide a transverse magnetic amplifier having an inductance capacitance circuit in which, for small oscillations in the circuit, the inductance presented by a winding linked to a magnetic core forming part of the circuit is an inversely varying function of the transverse biasing magnetizing force applied to the core by an auxiliary current source.

It is an object of the invention to provide a transverse magnetic amplifier in which at the phases of the inductance oscillations when current is a maximum, the transverse bias field is stepped up to a high value, with the effect of decreasing inductance while leaving the inductance current product substantially unchanged whereby energy available for the oscillations is increased.

It is an object of the invention to provide a transverse magnetic amplifier which at the phases of the inductance capacitance oscillations when the current passes through zero, the transverse bias field is stepped back to a lower level, which action increases the effective inductance to its original value but does not affect the inductance capacitance circuit, because of the absence of current in the inductor at such times. This action returns the inductance to its high value and sets the stage for similar succeeding cycles.

It is an object of the invention to provide a transverse magnetic amplifier in which the effect of the manipulation of the bias source is to increase the magnitude of the inductance capacitance oscillations, which in the usual case under consideration are not sinusoidal but of a complex shape, almost indefinitely.

Because the energy supplied to the oscillations per cycle by the bias source is proportional to the amplitude of these oscillations, it is doubtful whether the copper losses in the circuit can in all cases quickly limit the amplitude of the oscillation. Any limitation, therefore, in a general sense will probably be due to the non-linearity of the inductance of the core of the transverse magnetic amplifier. This inductance will be approximately constant for a fixed value of transverse bias only for small amplitudes of the inductance caapcitance oscillation. For large amplitudes, the inductance will vary with instantaneous current in a manner depending upon the circuit loss which will in most cases cause the event in the inductance capacitance circuit to move out of synchronism with the changes in the transverse bias level. For proper operation of a transverse magnetic amplifier of the present type, it will be seen that these bias changes must occur at predetermined instants of time and cannot readily be made to occur at times fitting the characteristics of all the circuit components, and in particular in the present discussion, the characteristics of the inductance capacitance circuit, unless the inductance capacitance circuits have natural frequencies which are constant and this can occur only for oscillation amplitudes which are not too high.

Reference is made to copending application Serial No. 494,903, filed on even date herewith.

In the figures, like numerals refer to like parts throughout.

Figures 1, 2, 3, 4:
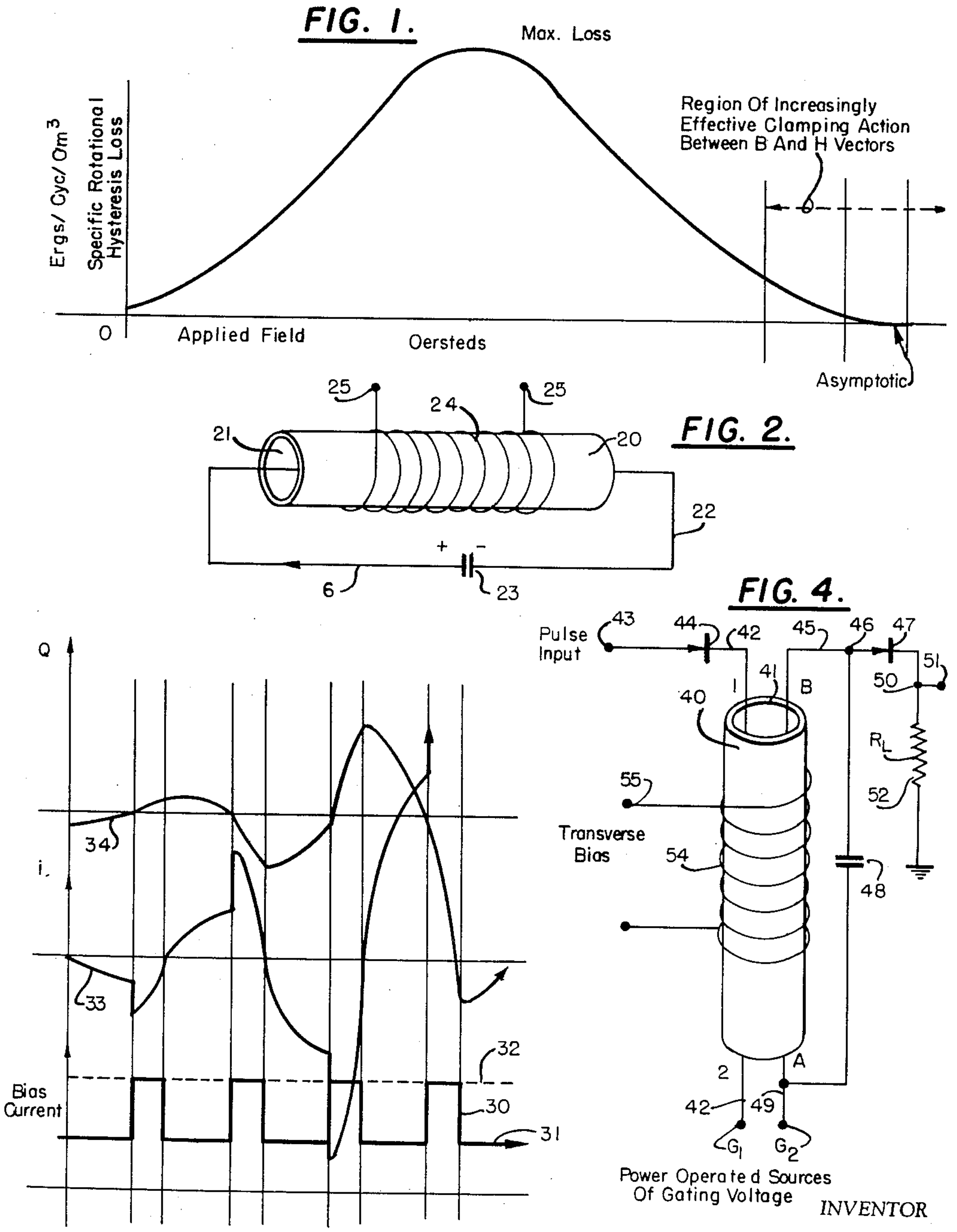
Figure 1 is a loss diagram for selected core materials qualitatively indicating the range for regions of vanishing rotation hysteresis. Operation of devices of the present type occurs in the regions to the right of the maximum, the more so as the characteristic hysteresis loop of the material departs from a rectangle.
Figure 2 is a simple schematic sketch of one form of amplifier element according to the present invention.
Figure 3 is a time graph illustrating the events of the structure of Figure 2 and other figures for analysis purposes.
Figure 4 is a schematic showing of a circuit of a progressive signal growth type amplifier complete with input and output coupling means.

A saturable reactor with transverse magnetization comprises a device having a magnetic core subjected to a plurality of fields which saturate the core material and produce an oscillation of the saturated magnetization vector of the material which follows to a greater or lesser degree the oscillation of the resultant field vector producing saturation, depending, at least to some extent, upon the value of the field above that required to produce saturation. As the scalar value of the resultant magnetic field increases above that required for saturation, experiment shows that the saturated magnetic flux vector comes increasingly under the dominance of the resultant magnetic field, and although the scalar value of the resultant magnetic flux changes little in value, it becomes to a greater and greater degree aligned with the resultant magnetic field as the field increases further and becomes locked substantially in alignment with it. That is, under such a condition of saturation, the field and flux vectors have substantially the same direction, and as the field vector rotates, the flux vector rotates with it continuing in the same direction as the field vector. At lesser values of the field, the field and flux vectors have different directions and the angle between them may vary. This characteristic of the saturated flux vector having the same direction as the field vector is termed "clamping action between the flux and field vectors B and H" in Fig. 1 and elsewhere in this specification and in certain claims.

The basic considerations concerning transverse devices comprising the present invention may be formulated as follows:

(1) Transverse fields are in general applied to a core of ferromagnetic material simultaneously. It may be noted that the B—H relationships are quantitatively unknown except under the conditions to be described below.

(2) It is possible by means of the invention to obtain quantitatively predictable B—H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density $\vec{B}$ is substantially given by the vector equation:

$$\vec{B}=\frac{Bs\vec{H}}{h} \quad (1)$$

where $B_s$ is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude $B_s$. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$h \geqslant hp \quad (2)$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see Figure 1) and for which the specific rotational hysteresis loss is appreciably less than said maximum rotational hysteresis loss.

In Figure 2 a simple circuit which illustrates the principles of the operation of the amplifier forming part of the present invention, input and output circiuts being omitted, comprises a core 20 of suitable magnetic material having a central channel 21 with a signal winding 22 threading the channel 21. Winding 22 has a capacitor 23 in its circuit. Although the winding 22 is shown with a single turn, it may contain as many turns as good design or the characteristics of the device may require. Around the periphery of the cylinder 20 is wound a transverse bias winding 24 provided with terminals 25. For the purposes of the present discussion it will be understood that while the tube 20 is preferably a ferrite tube, any other ferrite body capable of being magnetized in two orthogonal directions may be utilized. If it be assumed that capacitor 23 is initially charged negatively and the current $i$ in winding 22, as indicated by the arrow, is initially zero, the subsequent operation of the circuit may be that illustrated in the diagrammatic time graph in Figure 3, proper manipulation of the bias source being assumed. It will be understood that Figure 3 is qualitative only. In Figure 3 the bias current is shown as a pulse train 30 near the bottom with a low level 31 and a high level 32. The curve 33 represents the possible values of the current flow in winding 22 and the curve 34 will represent possible values of the charge on condenser 23. The several pulses of bias current 30 may be thought of as clock pulses and therefore represent time as well as a saturating bias input. It will be understood that the material of core 20 is operated in the region to the right of the maximum of the curve of Figure 1 and preferably in that portion of the region of the clamping or aligning action between the saturating result and the field and the saturated magnetization vector and the region of vanishing rotation hysteresis loss as will yield optimum results. Operation may of course in many cases be preferable in the region of diminishing rotational hysteresis. The charge Q on the condenser 23 and the current $i$ in winding 22 build up exponentially with time as the pulses 30 recur regularly. This exponential buildup increases with a number of cycles until non-linearity produces enough asynchronism to limit the amplitude.

In Figure 4 a core of suitable magnetic material 40 is provided with a central channel 41 threaded by a pulse input winding 42 having one terminal at G1 and a second terminal 43 comprising the pulse input terminal. A diode 44 is connected in series with the winding 42 with its anode on the pulse input terminal 43 as shown in the drawing. An output circuit 45 threads the channel 41 and has one terminal represented by G2 and the other terminal connected to junction 46 with the anode of diode 47 and one terminal of a condenser 48. The other terminal of condenser 48 is connected to junction 49 with the winding 45. The cathode of diode 47 is connected to junction 50 with output terminal 51 and one terminal of load resistor 52, the other terminal of which is grounded at 53. Around the outer curved surface of core 40 is wound a transverse bias winding 54 having terminals 55 for the supply of saturating bias current thereto. The operation of the circuit of Figure 4 may take the following sequence of events.

At the beginning, the terminal G1 is at ground potential and the terminal G2 is sufficiently negative so that diode 47 is cut off and diode 44 is conducting. G1 and G2 may be thought of as power-operated voltage sources for gating purposes. Under these conditions a positive pulse of input voltage will send current through diode 44 and the winding 42 in the core. The reaction on the winding 45 containing condenser 48 will induce a current flowing, say, in a clockwise direction which tends to oppose the change of flux in the core 40. However, this induced current will actually go through zero and reverse because the circuit 45 is oscillatory. As a result, there will come a time when the current flowing in the circuit 45 will become a maximum in a clockwise direction if the input voltage is maintained for a sufficiently long period, depending upon the circuit constants. At this time of maximum current in the winding 45, the voltage at G1 is raised to a large positive value, cutting off the diode 44 which effectively transfers the current which had been flowing in the winding 42 over to the winding 45 where it adds to the current already flowing in a clockwise direction there. G1 is maintained at the large positive potential for the remainder of the cycle under discussion. If, during this period, the winding 42 is effectively open and the winding 45 is free of the load resistance 52 because of the non-conductivity of diode 47, the circuit of winding 45 including condenser 48 will tend to oscillate. It is at this time, during the oscillation of the circuit 45, that the transverse bias source connected to terminals 55 is brought into operation. As noted above, for small oscillations in the inductance capacitance circuit 45 the inductance L associated with winding 45 on core 40 varies inversely with the magnitude of the biasing (transverse) magnetizing force instantaneously applied to the core by winding 54. The transverse bias field established by winding 54, and the application of transverse bias power to the terminals 55, is stepped up to a high level when the current flow is a maximum. This action decreases the effective value of the inductance of the core, leaving the inductance current product $Li$ substantially unchanged, and increasing the energy available for the oscillations. At the phases of the inductance capacitance oscillations when the current passes through zero the transverse bias field is stepped back to the lower level. This increases the inductance of the core to its original value but does not affect the inductance capacitance 45, 48 because there is no current in the inductor at these times. This returning of the inductance of the core to its high value places the device in condition for its next cycle. It will be seen that the bias current applied to terminals 55 is at suitable times switched back and forth between its lower level and a higher level as shown in the lower part of the graph of Figure 3. As previously described, this builds up the level of the oscillatory energy associated with the circuit 45 in the manner shown in a qualitative form by the curve 34. When the oscillations in the circuit 45 reach a suitable level of power or limiting amplitude, then the voltage at G2 is brought up to ground potential and the diode 47 becomes conducting. As a result, the positive half cycles of voltage on the capacitor C will appear across the load resistor 52. The heavy loading on the oscillating circuit 45 that will result from this action will quickly damp out the oscillations in the circuit 45. After this damping action G2 can resume its negative value, cutting off diode 47, and G1 can return to ground potential to prepare for the next amplifying operation. It should be noted that just before G2 is raised to ground potential at the time output is desired, the bias source at terminals 55 can be reset to its lower level, as shown in Figure 3, and left there until the next amplifying operation. That is, it is not necessary, and not necessarily desirable, to continue to manipulate the bias level while an output is being taken from the amplifier. Although the reference to the curve 30 as representative of clock pulses above may be acceptable for some operations of the device, it is in no sense a universal term, since as stated, the curve 30 representing the bias pulses may remain at its lower level 31 for some considerable period of time as time is measured in digital computing devices and like applications.

The operation of the preferred form of the invention shown in Figure 4 may be summarized as follows:

(1) G1 and G2 are power-operated voltage sources for gating purposes;

(2) During input time, G2 is sufficiently negative so diode 47 opens;

(3) G1 is at ground potential during input time;

(4) Pulsating transverse bias, of wave shape shown at 30, is applied continuously at terminals 55;

(5) An input signal pulse applied at input terminal 43 establishes a current in winding 42;

(6) When current exists in winding 42, G1 goes sufficiently positive to cut off diode 44, eliminating current in winding 42 and inducing proportional current between A—B in winding 45, which begins to charge condenser 48;

(7) Immediately following this action and while current in 45 remains near its initially induced value, the step increase in transverse bias current occurs, resulting in a sudden step increase in current in winding 45;

(7*a*) The aforementioned step increase in current in winding 45, accompanying and caused by the step increase in transverse bias current, is essential to the operation of the device, and bears further explanation: The step increase in bias current tends to align the magnetic induction vector in the core, $\vec{B}$, more in the longitudinal direction (vertically in Fig. 4); the induction vector has essentially fixed scalar magnitude $B_s$ due to its saturation by the applied magnetizing fields, and therefore as it tends to align itself more into the longitudinal direction, its component in the circumferential direction, linking coil 45, tends to decrease and induce E. M. F. in coil 45, increasing the existing current flowing in coil 45. The increased current in coil 45 tends to oppose the increased longitudinal alignment of the induction vector by producing an increased circumferential magnetizing field. Because the circuits closing the terminals of coil 45 (i. e. condenser 48) has low A. C. impedance, the current in coil 45 can increase in this manner quite readily, strongly opposing the increased longitudinal alignment of the induction vector, so that only a very small increase in such longitudinal alignment will actually occur; this circumstance (i. e. essential constancy in direction of the induction vector during the step increase of the transverse bias current) requires that during the step increase in transverse bias current the current in coil 45 also undergo a step increase, maintaining a nearly constant proportion to the transverse bias current during its step increase. Hence if the step increase raises the transverse bias current by a large numerical factor, the current in coil 45 will be forced to undergo a step increase by nearly the same numerical factor, providing a clearcut amplification of said current, as desired.

(8) The transverse bias current is maintained at a high level until condenser 48 reaches maximum charge and current in winding 45 is substantially zero, at which time the transverse bias current in coil 54 is stepped down to the original level 31;

(9) This down-step action, being timed to occur when current in coil 45 is momentarily zero, does not affect circuit 45;

(9*a*) The lack of effect of the down-step in transverse bias current on the circuit 45 is essential to the operation of the device, and bears further explanation: When current in coil 45 is momentarily zero, the circumferential magnetizing field it produces in the core is also zero, and the induction vector is therefore oriented longitudinally at this moment. (The total circumferential magnetizing field in the core is then zero since current in coil 42 has been cut off as described in (6) above and is kept cut off through the action of blocking bias G, until such later time that the amplifier is to be receptive to new input at 43.)

The step decrease in the transverse bias current exerts no tendency to increase or otherwise change the circumferential component of induction from the zero value it momentarily enjoys, and hence does not produce any inductive voltage in coil 45. This timing of the down-step in the transverse bias current is thus such as not to affect circuit 45, as desired.

(10) The bias at 55 remains at low level 31 until condenser 48 is discharged, at which time current in winding 45 is maximum;

(11) The cycle 7 through 10 is repeated periodically and current swing in winding 45 is periodically increased until such time that output is desired. At that time, which is so chosen that it finds the condenser 48 fully charged in such polarity that point 46 is positive with respect to point 49, G2 is brought to ground by the power-operated voltage source, and the built-up voltage across 46—49 is coupled through diode 47 and is available at 50 as an output.

While there have been described above what are at present believed to be the preferred forms of the invention, other forms will suggest themselves to those skilled in the art. All such variations as fall within the true spirit of the invention are intended to be covered by the generic terms of the claims set forth below.

I claim:

1. In a pulse type transverse magnetic amplifier with progressive signal growth, a core of ferromagnetic material, a winding on said core, a source of biasing pulses connected to said winding, an input winding on said core transverse with respect to said bias winding, voltage controlled current blocking means connected to said input winding to control the flow of current therein, a source of control voltage connected to said blocking means to control the current applied to said input winding, a signal input for said input winding, an output circuit comprising an output winding on said core, a condenser, load means, and voltage controlled current blocking means connected to said output winding, and a source of control voltage connected to said output circuit blocking means to control the current from said output winding applied to said load means, the resultant magnetic field produced in said core being sufficiently large to carry the core material into the region of vanishing rotational hysteresis loss and effective clamping action between the resultant magnetic field and the resultant magnetic flux produced thereby.

2. In a pulse type transverse magnetic amplifier with progressive signal growth, a core of ferromagnetic material, a winding on said core, a source of periodically pulsed bias current connected to said winding, an input winding on said core having current-blocking means as a part thereof and a source of control voltage connected to said current-blocking means of said input winding, a signal input for said input winding, an output circuit comprising an output winding on said core, a condenser, load means, and current blocking means connected between said output winding and said load means, said input and output windings being transverse with respect to said bias current winding and a source of control voltage for said last-named blocking means, said control voltages and said pulsed bias current being so timed and having such values that said condenser is cyclically charged to produce an amplified output signal, the resultant magnetic field produced in said core being sufficiently large to carry the core material into the region of vanishing rotational hysteresis loss and effective clamping action between the resultant magnetic field and the resultant magnetic flux produced thereby.

3. The combination set forth in claim 2 with said condenser being connected across said output winding.

4. In a pulse type transverse magnetic amplifier with progressive signal growth, a core of ferromagnetic material, a winding on said core, a source of periodically pulsed bias current connected to said winding, an output winding on said core transverse with respect to said bias current winding, a condenser connected across said output winding, input means coupled to said core for applying input signals thereto, load means connected to said output winding, said input signals tending to produce a magnetization in said core along an axis parallel to the magnetization axis of said output winding and transverse to that of said bias current winding and tending to induce a condenser charging current in said output winding, and means for controlling the application of signals by said input means and for controlling the passage of current induced in said output winding to said load means, said pulsed bias current being so timed in duration and initiation that said condenser is successively charged to produce an amplified output signal, the resultant magnetic field produced in said core being sufficiently large to carry the core material into the region of vanishing rotational hysteresis loss and effective clamping action between the resultant magnetic field and the resultant magnetic flux produced thereby.

5. The combination set forth in claim 4 wherein said means for controlling the application of signals and the passage of current includes current-blocking means connected to said input means and to said output winding, and control voltage means therefor.

No references cited.